(12) United States Patent
Baldaccini

(10) Patent No.: US 12,544,863 B2
(45) Date of Patent: Feb. 10, 2026

(54) TURRET FOR A LASER MACHINE AND/OR A MEASURING MACHINE SUITABLE FOR MOUNTING OPTICAL DEVICES

(71) Applicant: Baldaccini Mario SA, Caslano (CH)

(72) Inventor: Stefano Baldaccini, Caslano (CH)

(73) Assignee: BALDACCINI MARIO SA, Caslano (CH)

( * ) Notice: Subject to any disclaimer, the term of this patent is extended or adjusted under 35 U.S.C. 154(b) by 374 days.

(21) Appl. No.: 18/549,213

(22) PCT Filed: Feb. 25, 2022

(86) PCT No.: PCT/IB2022/051671
§ 371 (c)(1),
(2) Date: Sep. 6, 2023

(87) PCT Pub. No.: WO2022/189879
PCT Pub. Date: Sep. 15, 2022

(65) Prior Publication Data
US 2024/0157487 A1    May 16, 2024

(30) Foreign Application Priority Data
Mar. 10, 2021   (IT) .................. 102021000005597

(51) Int. Cl.
*B23K 37/02*    (2006.01)
*G01B 11/24*    (2006.01)

(52) U.S. Cl.
CPC ...... *B23K 37/0288* (2013.01); *B23K 37/0247* (2013.01); *G01B 11/24* (2013.01)

(58) Field of Classification Search
CPC . B23K 37/0288; B23K 37/0247; G01B 11/24
See application file for complete search history.

(56) References Cited

U.S. PATENT DOCUMENTS

| | | | | |
|---|---|---|---|---|
| 5,008,510 A * | 4/1991 | Koseki | ................ | B23K 26/042 219/121.84 |
| 11,703,597 B2 * | 7/2023 | Mark | .................... | G01S 7/4972 356/4.01 |
| 2008/0278790 A1 * | 11/2008 | Boesser | ................ | G01B 11/24 359/227 |

(Continued)

*Primary Examiner* — Omar Flores Sanchez
(74) *Attorney, Agent, or Firm* — Levine Bagade Han LLP

(57) ABSTRACT

Object of the invention is a laser machine and/or a measuring machine adapted for mounting at least one optical device and for rotating it at a workpiece to be processed and/or measured, said turret (10) comprising: —at least one turret body supported by the machine; —at least one rotating drum (120) supported by said turret body and supporting at least two devices chosen from optical, gripping, processing, measuring or vision devices; —a laser scanner mounted, in whole or in part, inside the rotating drum of the above-mentioned turret; —said laser scanner being able to use a laser beam, the above-mentioned laser beam having a reflection axis and being generated by a laser generator external to the above-mentioned turrent (10); wherein—the rotating drug (120) is mounted rotating around said turrent body so as to rotate to bring each device alternatively in alignment with or at the axis of reflection of the laser beam coming from the laser scanner.

11 Claims, 4 Drawing Sheets

(56) References Cited

U.S. PATENT DOCUMENTS

| | | |
|---|---|---|
| 2009/0073586 A1 | 3/2009 | Fry et al. |
| 2015/0174661 A1* | 6/2015 | Brandstrom ....... B23K 37/0276 228/9 |
| 2018/0200822 A1* | 7/2018 | Xu .................... B23K 37/0276 |
| 2019/0011257 A1 | 1/2019 | Schwendener et al. |
| 2019/0091799 A1* | 3/2019 | Deiss .................... B23Q 7/006 |
| 2019/0200000 A1 | 6/2019 | Kumagai et al. |
| 2021/0069812 A1* | 3/2021 | Bublik ................... B23K 9/173 |

\* cited by examiner

TURRET FOR A LASER MACHINE AND/OR A MEASURING MACHINE SUITABLE FOR MOUNTING OPTICAL DEVICES

CROSS-REFERENCE TO RELATED APPLICATIONS

This application is a U.S. national phase under 35 U.S.C. 371 of International Patent Application Number PCT/IB2022/051671 filed Feb. 25, 2022, which claims priority to Italian Patent Application Number IT 102021000005597 filed Mar. 10, 2021, the contents of which are incorporated herein by reference in their entireties.

FIELD OF THE INVENTION

Object of the present invention is a turret for a laser machine and/or a measuring machine adapted for mounting optical devices.

KNOWN PRIOR ART

It is known that laser scanners are tools able to measure the position of hundreds of thousands of points defining the surface of surrounding objects at a very high speed.

Laser scanners operate by using the reflection of a laser light beam emitted by an emitting device on the object to be measured so as to reproduce the shape of the surface of the object itself. Another operating method of the laser scanner is to orient the laser beam on the workpieces to be processed. Thanks to this system, many different operations can be carried out, such as engraving, ablation, welding, cutting, localized heat treatment and the like.

The device for emitting the laser light beam is generally combined with one or two scanning mirrors. The scanning mirror can take different positions so that when it is struck by the laser light beam coming from the emitting device, it redirects such laser light beam towards the object to be measured or processed. The extent of the area scanned is a function of the angle of rotation travelled by the mirror.

The reception of the laser beam can be carried out by means of different optical devices, depending on the processing needs.

Object of the present invention is thus to provide a system which allows to bring the desired optical device in alignment with the object to be scanned or processed.

Another object of the invention is to increase the alignment precision of the optical device used.

Further object of the invention is to achieve the above-mentioned result in an economic and practical way.

Other objects and advantages of the invention will become clearer in the following description.

BRIEF SUMMARY OF THE INVENTION

The objects described are achieved thanks to a turret for a laser machine and/or a measuring machine adapted for mounting at least one optical device and for rotating it at a workpiece to be processed and/or measured, said turret comprising:
  at least one turret body supported by the machine;
  at least one rotating drum supported by said turret body and supporting at least two devices chosen from optical, gripping, processing, measuring or vision devices;
  a laser scanner mounted, in whole or in part, inside the rotating drum of the above-mentioned turret;
  said laser scanner being able to use a laser beam, the above-mentioned laser beam having a reflection axis and being generated by a laser generator external to the turret; wherein
  the rotating drum is mounted rotating around said turret body so as to rotate to bring each device alternatively in alignment with or at the above-mentioned axis of reflection of the laser beam coming from the above-mentioned laser scanner.

The invention has numerous and important advantages.

Firstly, it allows to achieve a vast versatility of use of a laser machine since, by using a rotating turret, it is possible to position the processing tool or optical device from time to time needed at the workpiece to be processed, all with a significant saving in terms of time and space and with consequent significant economic advantages.

Secondly, the invention allows to achieve detection and processing precision combined with speed and effectiveness.

According to an embodiment of the present invention, the rotating drum is provided with a translation movement.

Moreover, according to a further embodiment, each of the above-mentioned optical, gripping, processing, measuring or vision devices is mounted on ultra-precise centering plates equipped with a zero-point indexing system.

In particular, the rotating drum is provided with a translation movement to enable the indexing system to be engaged and disengaged on the centering plates, which in turn carry one of the optical, gripping, processing, measuring or vision devices.

Further characteristics of the invention can be deduced from the dependent claims.

BRIEF DESCRIPTION OF THE FIGURES

The advantages of the invention are clear in the review of the figures illustrated in the accompanying tables, in which.

DETAILED DESCRIPTION OF THE INVENTION

With initial reference to FIGS. 1-5, a turret for a laser machine and/or a measuring machine, generally denoted by the numerical reference 10, is now described.

Figure 1:
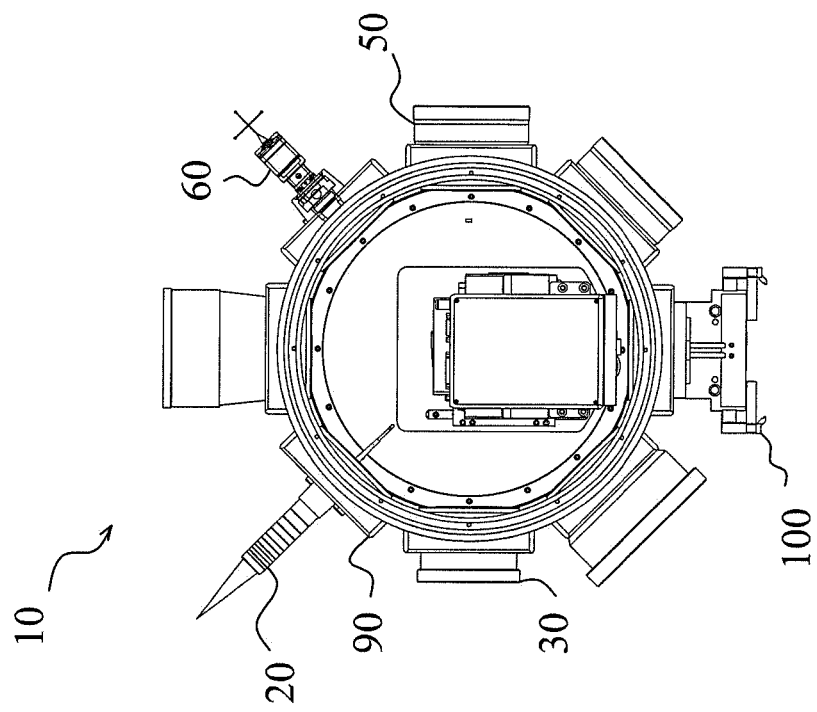
FIG. 1 is a view of a turret according to an embodiment of the present invention.
Figure 2:
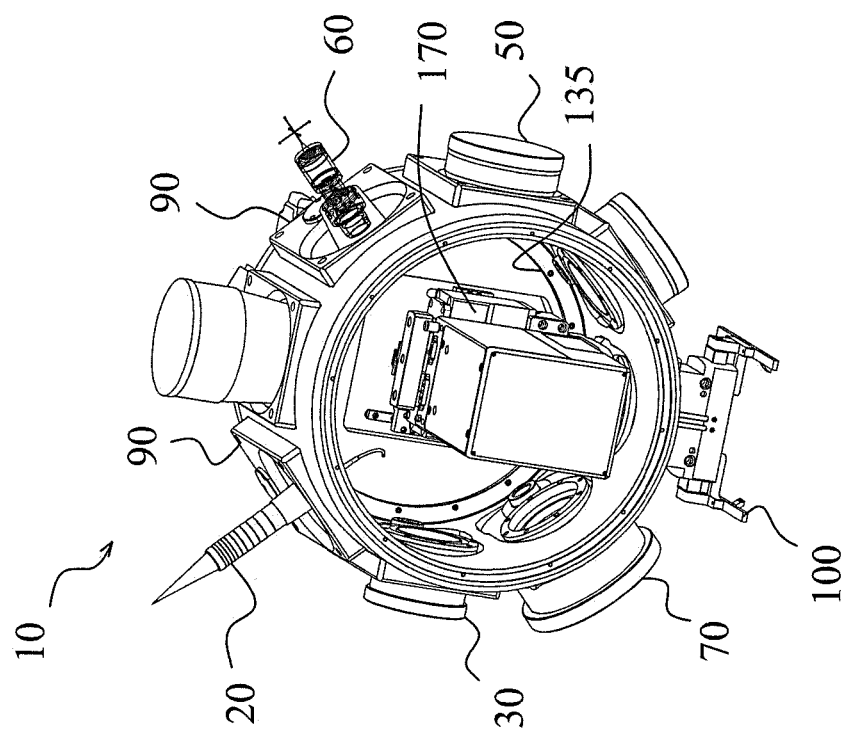
FIG. 2 is a schematic front view of the turret of FIG. 1.
Figures 3, 4, 5:
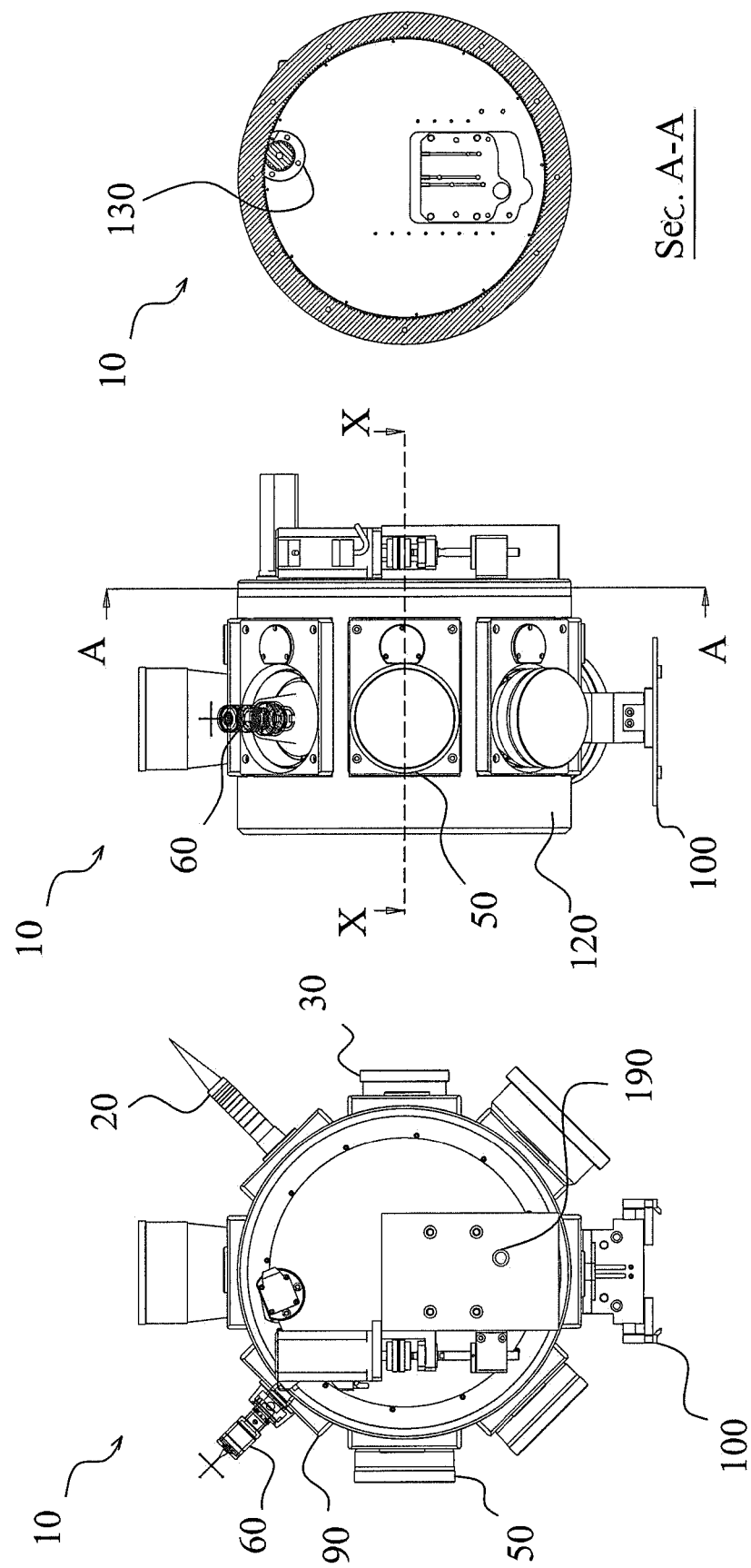
FIG. 3 is a schematic front view of the turret of FIG. 1 taken from the opposite side with respect to FIG. 2.
FIG. 4 is a side view of the turret of FIG. 1.
FIG. 5 is a further sectional view, according to the plane A-A of FIG. 4, of the turret according to an embodiment of the present invention.

The turret 10 is rotating around an axis denoted by X-X in FIG. 4 to carry optical devices, or possibly devices for mechanical processing, and to insert other types of devices at a workpiece to be processed and/or measured.

In particular, the turret 10 comprises at least one turret body supported by the laser machine and/or measuring machine.

The turret 10 comprises at least one rotating drum 120 supported by the turret body.

The rotating drum 120 supports at least two optical or gripping or processing or measuring devices.

More in detail, with reference to FIGS. 1-5, the following devices mounted on the rotary table 120 can be identified, for example a chromatic confocal sensor 20, a lens 30 with a focal length of less than 50 mm, a lens 50 with a focal length of about 100 mm, a lens 70 with a focal length of more than 160 mm and the like.

The optical devices are angularly spaced with respect to the rotating drum 120 of the turret 10 and, in the embodiment described, eight different positions are provided and angularly spaced of the same angle, with the warning that it is not always necessary for the angle to be the same in alternative embodiments of the present invention for such devices on the turret 10.

In addition to the optical devices and always angularly spaced with respect to the rotating drum 120 of the turret 10, there are processing devices such as, for example, a three-dimensional mechanical probe 60, a laser cutting head 40 and a pneumatic gripper 100.

Thus, in general, the rotating drum 120 supports at least two devices chosen from optical, gripping, processing, measuring or vision devices.

Such optical, gripping, processing, measuring or vision devices are mounted on centering plates 90 equipped with an indexing system which precisely restrict their position in all degrees of freedom (3 translations plus 3 rotations).

A laser scanner mounted, in whole or in part, inside the rotating drum 120 of the turret 10 is further present.

Such laser scanner can consist of a galvanometric scanner.

The laser scanner is able to use a laser beam generated by a laser generator external to the turret 10.

A camera, which operates autonomously and does not require a laser scanner, can also be present.

The laser scanner is able to use a laser beam, wherein the above-mentioned laser beam has a reflection axis and wherein the above-mentioned laser beam is generated by a laser generator external to the above-mentioned turret 10.

As far as the rotating drum 120 is concerned, it is provided with a translation movement.

In particular, the translation movement of the rotating drum 120 allows to engage and disengage the indexing system on the centering plates 90, which in turn carry one among the optical or measuring devices.

Moreover, the rotating drum 120 is mounted rotating around the turret body so as to rotate around the axis X to bring each optical device alternatively in alignment with or at the above-mentioned axis of reflection of the laser beam coming from the laser scanner.

In particular, the translation movement of the turret 10 is generated by means of a drive motor 160 along respective translation guides 150 and makes use of a carriage 110.

Moreover, the rotating drum 120 is mounted rotating around the turret body so as to rotate to bring each optical device in alignment with the reflection of the laser beam coming from the laser scanner.

In the event of non-optical devices, the rotation of the rotating drum 120 brings the device into the working position in front of the workpiece.

In particular, the rotation of the rotating drum 120 with respect to the turret body is performed by means of a pinion 130 and an internal toothed wheel 135 and makes use of the presence of bearings 140.

The laser beam is adjusted by means of an adjustment system 180 and is projected through a channel 190 (see FIG. 3).

In the turret 10, each of the aforesaid optical devices is placed on a respective indexing plate 90 which allows to position it under the scanner in a precise and repeatable way.

The indexing plates 90 are combined with a respective indexing interface, preferably pneumatically driven.

FIGS. 6-9 depict a turret according to an alternative embodiment of the present invention.

Figure 7:
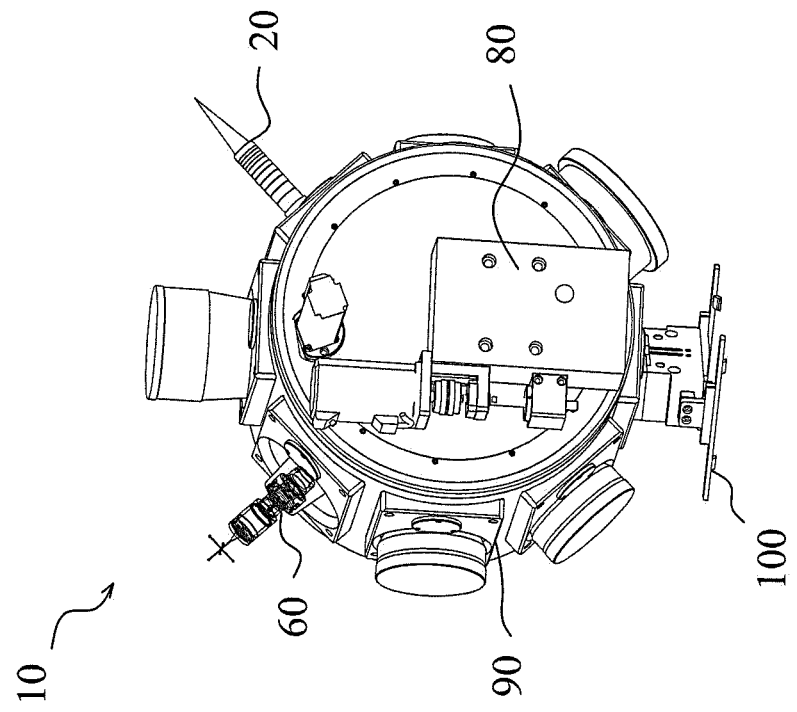
FIG. 7 is a schematic front view of the turret of FIG. 6.
Figure 6:
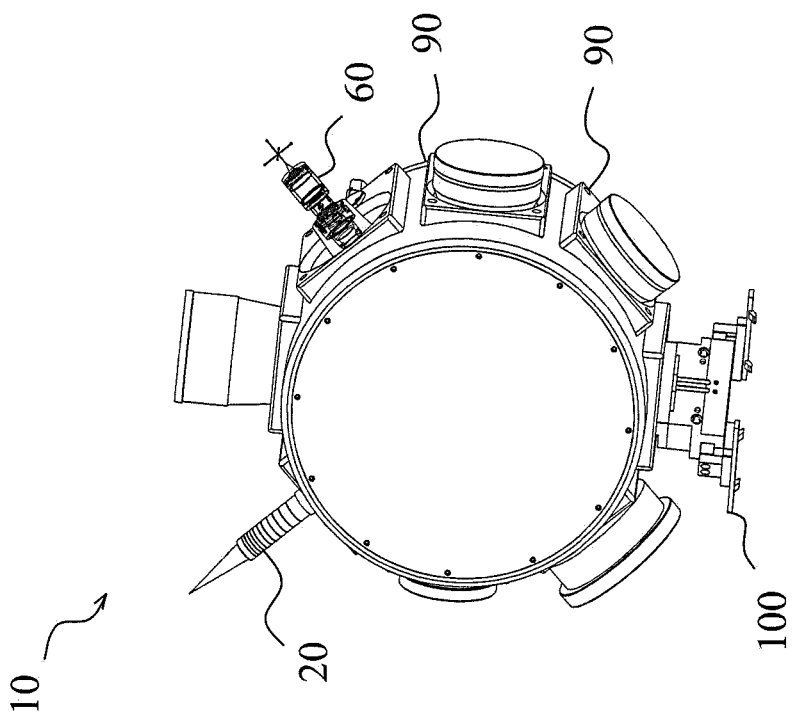
FIG. 6 is a schematic front view of a turret according to the present invention.

In particular, the confocal sensor 20 and the mechanical probe 60 are visible in FIGS. 6-7, as well as the indexing plates 90.

Figure 8:
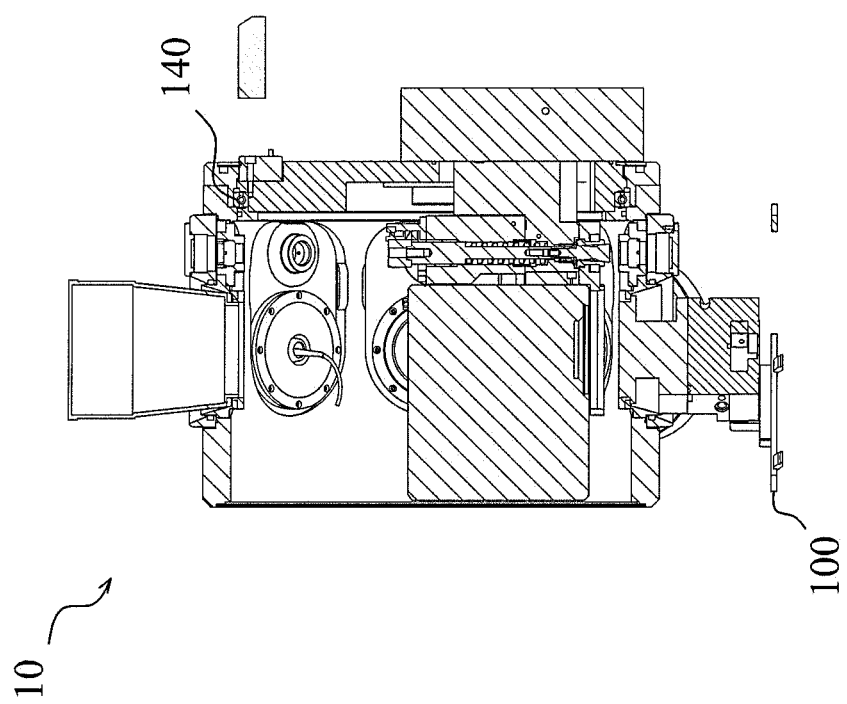
FIG. 8 is a sectional view according to a plane parallel to the rotation axis of the turret of FIG. 6.

FIG. 8 is a sectional view according to a plane parallel to the rotation axis of the turret of FIGS. 6-7, in which the bearings 140 that allow the rotary movement of the turret are visible.

Figure 9:
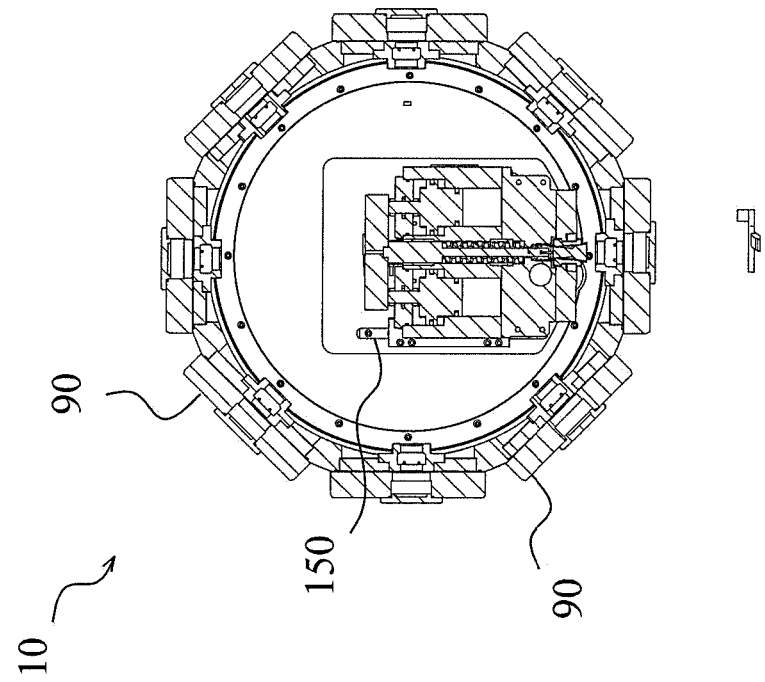
FIG. 9 is a sectional view according to a plane perpendicular to the rotation axis of the turret of FIG. 6.

FIG. 9 is a sectional view according to a plane perpendicular to the rotation axis of the turret of FIGS. 6-7, in which the translation guides 150 and the indexing plates 90 are in particular visible.

In general, the laser, in the context of the present invention, is mainly used for processing and not for measuring.

Whenever desiring to use it for measuring, it can be combined with a probe which is taken in a rigid and precise way by the indexing system.

A second possibility is to position a camera on the correct position for measuring images.

It is also possible to position the camera upstream of the scanner and to use the reflected image.

This allows to position magnifying lenses on plates at the output for even greater precision.

Moreover, the rotating drum is preferably provided with an airtight closure.

The airtight closure of the rotating drum is ensured by the injection of pressurized air, through special insufflation means, in such a way that the pressure generated inside the rotating drum does not allow foreign bodies to penetrate inside.

Obviously, modifications or improvements that are dictated by contingent or particular reasons may be made to the invention as described, without thereby departing form the scope of the invention as claimed below.

The invention claimed is:

1. A turret for a laser machine and/or a measuring machine suitable for mounting at least one optical device and for rotating it into a correspondence with a workpiece to be processed and/or measured, said turret comprising:
    at least one turret body supported by the machine;
    at least one rotating drum supported by said turret body and supporting at least two devices chosen from optical, gripping, processing, measuring or vision devices;
    a laser scanner mounted, in whole or in part, inside the rotating drum of the turret;
    said laser scanner being able to use a laser beam, the laser beam having a reflection axis and being generated by a laser generator external to the turret; wherein
    the rotating drum is mounted rotating around said turret body so as to rotate to bring each device alternatively in alignment or in correspondence with the reflection axis of the laser beam coming from the laser scanner.

2. The turret of claim 1, wherein the rotating drum is provided with a translation movement.

3. The turret of claim 1, wherein each of the optical, gripping, processing, measuring or vision devices is mounted on centering plates equipped with an indexing system.

4. The turret of claim 3, wherein the rotating drum is provided with a translation movement to enable engagement and disengagement of the indexing system on the centering plates which in turn carry one of the optical, gripping, processing, measuring or vision devices.

5. The turret of claim 1, wherein a plurality of optical devices is provided, wherein each of the optical devices is angularly spaced with respect to the rotating drum of the turret.

6. The turret of claim 2, wherein the optical devices are selected from the group consisting of a chromatic confocal sensor, a lens with a focal length of less than 50 mm, a lens with a focal length of about 100 mm, a lens with a focal length of more than 160 mm, and a camera.

7. The turret of claim 1, wherein the rotating drum is provided with an airtight closure.

8. The turret of claim 7, wherein the airtight closure of the rotating drum is ensured by the injection of pressurized air, through special insufflation means, in such a way that the pressure generated inside the rotating drum does not allow foreign bodies to penetrate inside.

9. The turret of claim 1, wherein a three-dimensional mechanical probe, a laser cutting head and a pneumatic gripper are provided and placed in respective angular positions of the rotating drum of the turret.

10. The turret of claim 1, wherein the rotation of the rotating drum with respect to the turret body is performed by means of a pinion and an internal toothed wheel.

11. The turret of claim 1, wherein the translation movement of the turret is generated by means of a drive motor along respective translation guides.

* * * * *